Figure 4:
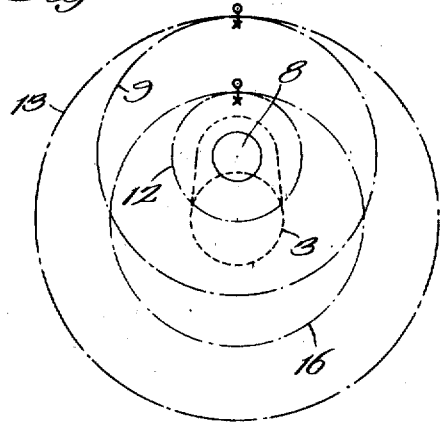

E. G. JOHANSON.
POWER TRANSMISSION MECHANISM.
APPLICATION FILED NOV. 9, 1917.
1,310,530.
Patented July 22, 1919.
3 SHEETS—SHEET 1.
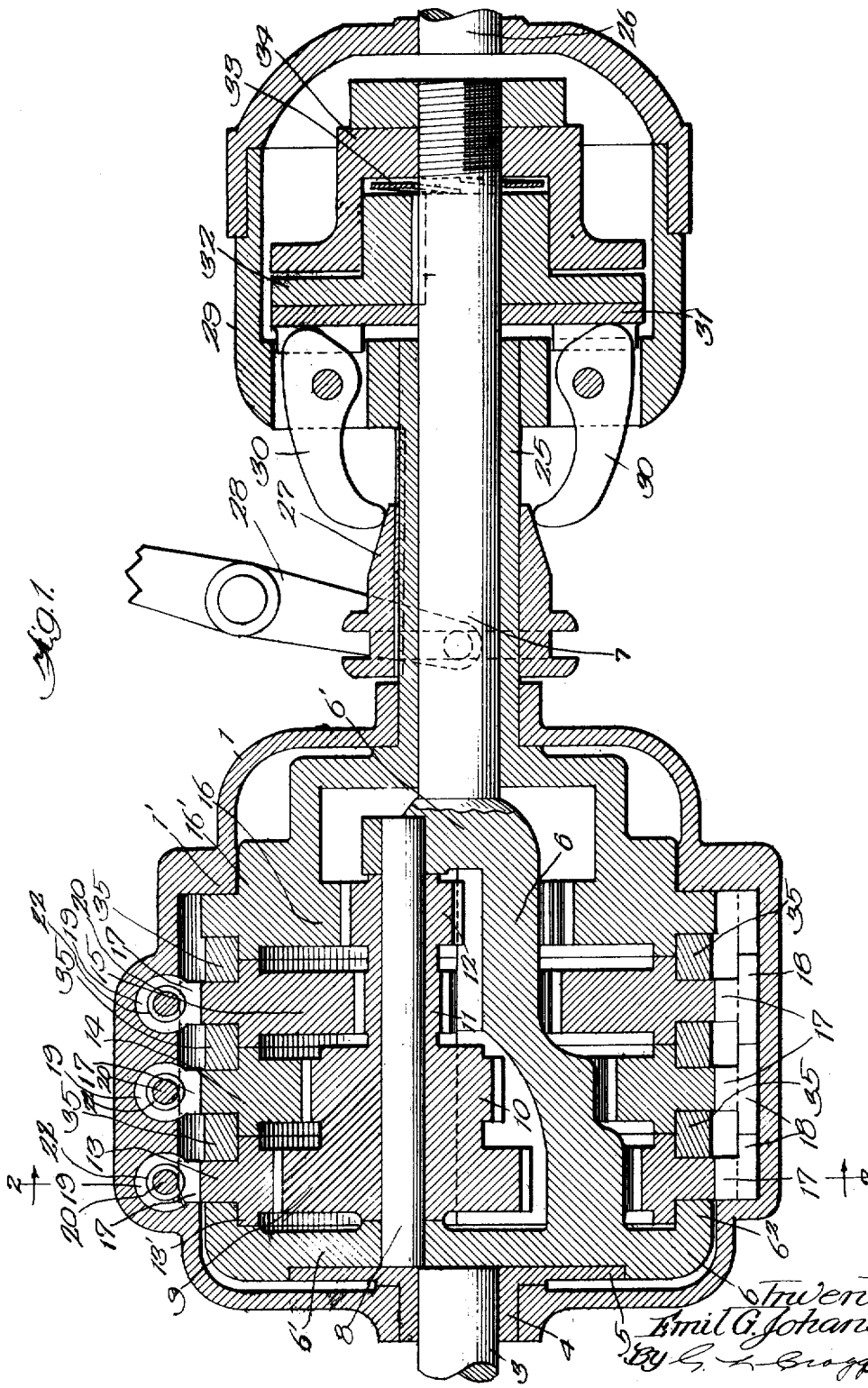

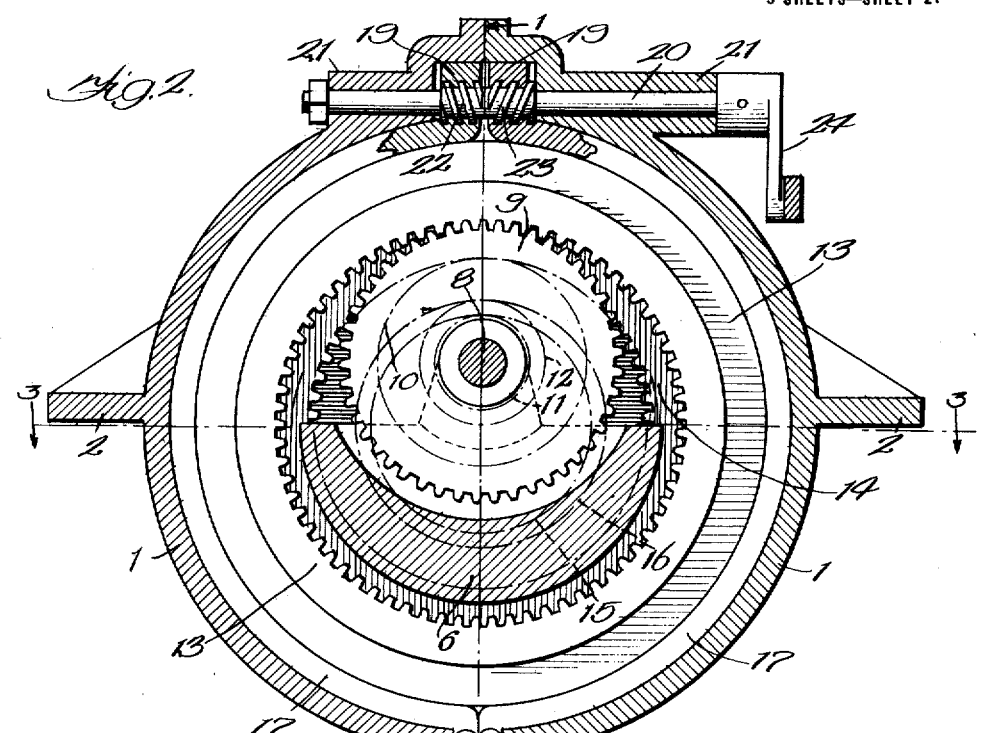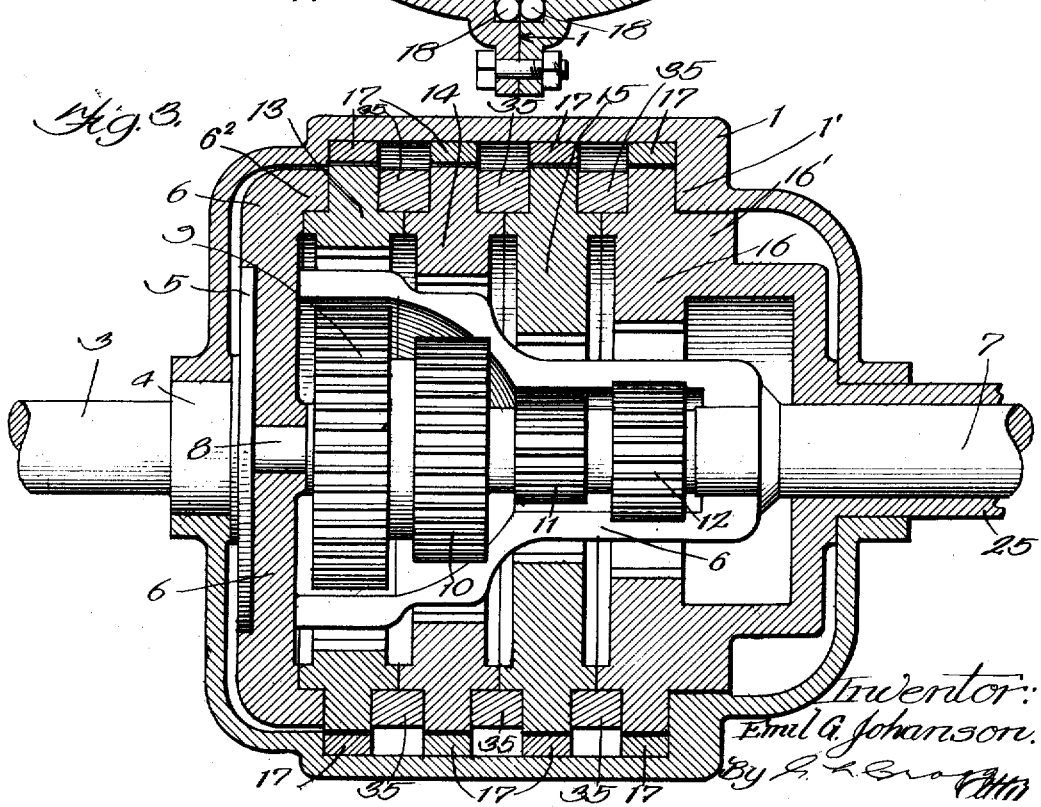

E. G. JOHANSON.
POWER TRANSMISSION MECHANISM.
APPLICATION FILED NOV. 9, 1917.

1,310,530.

Patented July 22, 1919.
3 SHEETS—SHEET 3.

Inventor:
Emil G. Johanson.

UNITED STATES PATENT OFFICE.

EMIL G. JOHANSON, OF CHICAGO, ILLINOIS.

POWER-TRANSMISSION MECHANISM.

1,310,530.  Specification of Letters Patent.  Patented July 22, 1919.

Application filed November 9, 1917. Serial No. 201,045.

*To all whom it may concern:*

Be it known that I, EMIL G. JOHANSON, subject of the King of Sweden, residing at Chicago, in the county of Cook and State of Illinois, have invented a certain new and useful Improvement in Power-Transmission Mechanism, of which the following is a full, clear, concise, and exact description.

My invention relates to power transmission mechanism and involves the employment of loose internal gears and mechanically coupled spur pinions in conjunction with means whereby one loose internal gear may be permitted to rotate or may have its rotation checked or totally prevented, such loose internal gear coöperating with another internal gear that normally is in connection with the load to drive the load. The gearing desirably includes at least two loose internal gears of different diameters whose rotation may be prevented or checked, these loose internal gears being in mesh with the mechanically coupled pinions. Driving power is preferably first applied to the pinions that operate upon the loose internal gears, one pinion coöperating with that one of the loose internal gears whose rotation is checked in order that the load may be driven. I do not wish to be limited however to the application of driving power initially to the pinions. When it is desired to prevent the engine or other prime mover from operating the load the rotation of both of the loose internal gears is checked. The gearing also desirably includes elements whereby the load may be rotated in either direction, in which arrangement the engine or other prime mover may be prevented from driving the load by checking the rotation of an unemployed loose internal gear. When the load is driven through the gearing, reverse idle rotation of the load is automatically prevented without any manual adjustment.

Clutching mechanism is also preferably employed whereby the shaft of the prime mover may be directly coupled with the ultimate load shaft without the intermediation of the gearing, idle reverse rotation of the load being prevented by holding any loose internal gear.

I will explain my invention more fully by reference to the accompanying drawings showing the preferred embodiment thereof and in which Figure 1 is a view in longitudinal section illustrating power transmission mechanism constructed in accordance with the invention; Fig. 2 is a view on line 2—2 of Fig. 1; Fig. 3 is a view on line 3—3 of Fig. 2; and Figs. 4, 5, 6, 7, 8 and 9 are diagrammatic views illustrating the operation of the gearing.

Like parts are indicated by similar characters of reference.

The changeable gearing is inclosed within a casing 1 that, in the embodiment illustrated, is stationarily mounted, there being shown mounting lugs 2 as one means for fixedly mounting the casing. When the casing 1 is stationary, the shaft 3 is driven. Any suitable form of prime mover such as an internal combustion engine or a steam engine may drive the shaft 3. The collar 4 is fixed upon the shaft 3 and has a flange 5 that is secured to the yoke 6. This yoke 6 rigidly connects the shaft extension 7 with the shaft 3, the shaft elements 3 and 7 being co-axial. The engine shaft structure thus comprises the main shaft section 3, the intermediate yoke section 6, and the final section 7. The two opposite sides $6^1$ of the yoke 6 are turned in unison with the shaft 3 and the extension 7 of such shaft and constitute a crank structure, an elongated crank pin 8 being carried by and between these yoke extensions $6^1$. This crank pin 8 extends parallel to the engine shaft 3—7 and on and with respect to which turn the fixedly connected pinions 9, 10, 11 and 12 that are eccentric with respect to the alined engine shaft sections 3—7. The pinions 9 and 10 are provided for driving the load in the normal direction, one of these pinions serving to drive the load at one rate of speed and the other at another rate of speed as will later be made clear. The pinion 12, as will be set forth, coöperates with pinion 9 or 10 in driving the load in its normal direction. Pinion 11 coöperates with the pinion 12 to drive the load in a reverse direction. Pinions 9, 10, 11 and 12 are respectively in mesh with internal gears 13, 14, 15 and 16. These internal gears surround the yoke section 6 of the engine shaft structure, this yoke section passing through the space intervening between the internal gears and pinions where these gear elements are not in mesh. The internal gears 13, 14 and 15 are provided with adjusting means whereby they are individually held from rotation or are permitted to rotate idly. In rotating the load in the normal direction one or the other of the gears 13, 14 is held from rotation according to the speed that is selected for the load, the gears 9 and 13 being of larger diameter than the gears 10 and 14 whereby the first two gears 9 and 13 are adapted to rotate the load at a higher rate of speed than the gears 10 and 14. Any suitable means may be employed for holding the internal gears 13, 14 and 15 from rotation, the construction shown in Fig. 2 being adaptable. In this figure of the drawings there is illustrated a clamp or brake band having two encompassing jaws 17 in hinged connection 18 with the stationary casing 1. These jaws have opposing enlargements 19 which are provided with alined bores that are threaded in opposite directions. A shaft 20 is journaled in the bearings 21 upon the stationary casing 1. This shaft has two oppositely directed sets of threads 22, 23 that are in engagement with the threads in the bores of the enlargements 19. Any suitable lever mechanism 24 is employed to turn the shafts 20 in one direction or the other. By turning the shaft in one direction the jaws 17 are clamped into engagement with the internal gear 13 to hold this internal gear stationary, whereupon the pinion 9 will coöperate with the internal gear 13 in turning the load in the normal direction, the other internal gears 14 and 15 being, at the time, loose.

If the load is to be operated at a lower speed in the normal direction the internal gear 14 is the only one of the three internal gears 13, 14, 15 that is held from rotation, the gears 13, 15 then running idly. If the direction of the load is to be reversed the internal gear 15 is the only one of the three gears 13, 14, 15 that is held from rotation. The employed gear 13, 14 or 15 and the pinion 9, 10 or 11 in mesh with the employed gear coöperate with the pinion 12 and the internal gear 16 to drive the load at the selected speed or direction. The internal gear 16, unlike the internal gears 13, 14 and 15, is in constant driving connection with the load driving quill shaft 25 that surrounds and is adapted to turn upon and with respect to the engine shaft extension 7, this quill shaft being turned as a consequence of the engagement of the internal gear 13, 14 or 15 that has been held from rotation with the pinion meshing with such selected internal gear and the action of the pinion 12 upon the internal gear 16, this pinion 12 being in fixed connection with the other pinions.

The rate at which the load is turned depends upon the differences in the diameters of the pitch circles of the internal gear 16 and the selected internal gear 13, 14 or 15. The pitch circles of the internal gears 13 and 14, being larger than the pitch circle of the internal gear 16, enable the gears 13, 14 to turn the load in the same or normal direction but the pitch circle of the internal gear 15, being smaller than the pitch circle of the internal gear 16, will cause reversed rotation of the load.

Figure 5:
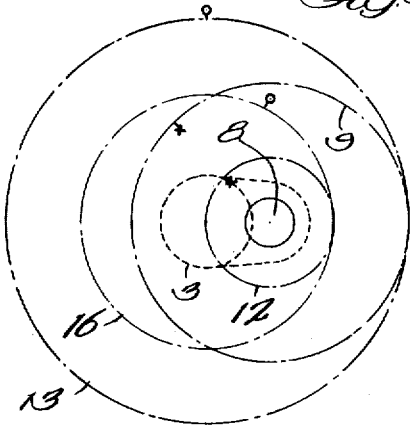
Figure 6:
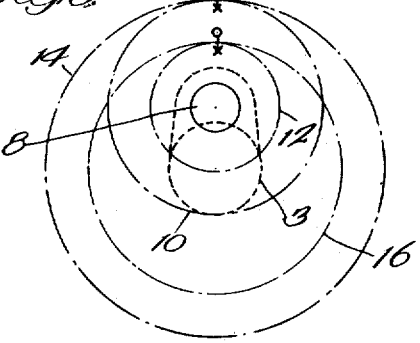
Figure 7:
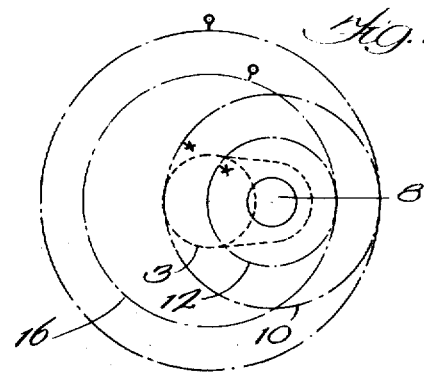
Figure 8:
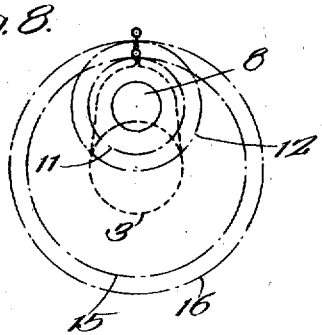
Figure 9:
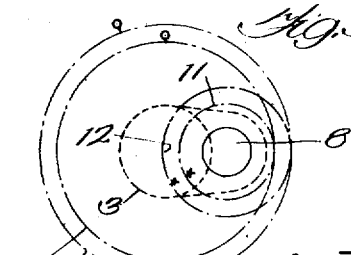

Figs. 4 to 9 inclusive diagrammatically illustrate the operations of the gearing and the directions in which they effect the turning of the load. The internal gears and the pinions, in these figures, are diagrammatically represented by single lines to which reference characters are applied that correspond to the gears and pinions. Figs. 4 and 5 illustrate the operation that results when the internal gear 13 is held stationary, Fig. 5 showing the load as having been given a quarter turn in its normal direction. Figs. 6 and 7 illustrate the operation that results when the internal gear 14 is held stationary, Fig. 7 showing the load as having been given a quarter turn in its normal direction. Figs. 8 and 9 illustrate the operation that results when the internal gear 15 is held stationary; and Fig. 9 shows the load as having been given a quarter turn in the reverse direction. The load driving shaft, for convenience of construction, is in the form of a quill shaft and is in fixed relation with the ultimate load shaft 26.

If it is desired, with the aid of the gearing, to prevent the engine from operating the load any plurality of internal gears 13, 14, 15 may be locked against rotation. The provision of a plurality of internal gears that may run loose or be held from rotation is thus advantageous whether or not they be associated with pinions that produce different rates of speed or change of direction and I therefore claim this feature of the invention irrespective of variation of speed and change of direction. It will also be observed that reverse direction of idle rotation of the load is automatically prevented without applying the brake to a second one of the internal gears 13, 14, 15.

It may be desired to drive the load shaft 26 independently of the gearing that I have described, in which event I desirably employ a clutching mechanism shown at the right hand end of Fig. 1. -This clutching mechanism includes a clutching collar 27 that is in splined connection with the quill shaft 25, there being a lever 28 for moving the clutching collar longitudinally of the quill shaft. This quill shaft is in fixed connection with a clutch housing 29 which, in turn, is in fixed connection with the shaft 26. This clutch housing carries clutching dogs 30 that are engaged by the clutching collar 27 and when the clutching collar is moved inwardly these clutching dogs press the clutching disk 31 into frictional clutching engagement with the clutching disk 32. The clutching disk 32 is keyed upon the engine shaft extension 7 so that when the clutching disk 31 is pressed against the clutching disk 32 the shaft extension 7, the clutch housing 29 and the shaft 26 will rotate as a unit, the clutching disk 31 being in such engagement with the clutching dogs 30 that these clutching dogs will cause the clutching disk to turn with the housing 29 and the shaft 26. The clutching member 32 may be backed by springs 33 to prevent the engagement of the clutching members 31, 32 from being too sudden. The springs 33 are backed by an abutment 34 that is extended into engagement with the part of the clutching member 32 that is engaged by the clutching disk 31.

The operation of the load by the engine and the idle reverse rotation of the load may be prevented, when the engine is directly coupled with the load, by holding any of the internal gears 13, 14, 15 from rotation.

The yoke 6 has an annular extension 6$^a$, co-axial with the shaft 3, that engages the annular portion 13$^1$ of the gear 13 to center the internal gear. The casing 1 has a circular shoulder 1$^1$ that is concentric with the shaft and engages the annular portion 16$^1$ of the internal gear 16 to center this gear. Loose rings 35 are interposed between the internal gears as illustrated and engage annular portions upon these gears that are similar in function to the annular portions 13$^1$, 16$^1$. By this arrangement as many internal gears may be placed in alinement as desired so that any preferred number of speeds may be arranged for.

The provision of a common crank pin for the pinions reduces the friction of the pinions upon their bearings to a minimum while the provision of the yoke in conjunction with such a crank pin forms a quadrilateral hollow section of the engine shaft which is thus made very strong and better enabled to maintain the common axis of the pinions in parallelism with the axis of the shaft and the common axis of the internal gears that is co-incident with the axis of the shaft.

While I have herein shown and particularly described the preferred embodiment of my invention I do not wish to be limited to the precise details of construction shown as changes may readily be made without departing from the spirit of my invention, but having thus described my invention I claim as new and desire to secure by Letters Patent the following:—

1. Power transmission mechanism including an internal gear mechanically coupled with the load; a second internal gear adapted to rotate idly; mechanically coupled pinions one in mesh with each internal gear; a stationary casing inclosing said gear elements; means, coöperating with said casing, for checking the rotation of the second internal gear; a shaft structure surrounded by the internal gears and passing between these internal gears and the pinions, said shaft structure including two alined sections and an intervening yoke section upon which yoke section the aforesaid pinions are mounted eccentrically with respect to the alined shaft sections; and a load driving quill shaft surrounding one of the aforesaid alined shaft sections and mechanically connected with the first internal gear.

2. Power transmission mechanism including an internal gear mechanically coupled with the load; a second internal gear adapted to rotate idly; mechanically coupled pinions one in mesh with each internal gear; means for checking the rotation of the second internal gear; a shaft structure surrounded by the internal gears and passing between these internal gears and the pinions, said shaft structure including two alined sections and an intervening yoke section upon which yoke section the aforesaid pinions are mounted eccentrically with respect to the alined shaft sections; and a load driving quill shaft surrounding one of the aforesaid alined shaft sections and mechanically connected with the first internal gear.

3. Power transmission mechanism including an internal gear mechanically coupled with the load; a second internal gear adapted to rotate idly; mechanically coupled pinions, one in mesh with each internal gear; a stationary casing inclosing said gear elements; means, coöperating with said casing, for checking the rotation of the second internal gear; and a shaft structure surrounded by the internal gears and passing between these internal gears and the pinions, said shaft structure including two alined sections and an intervening yoke section upon which yoke section the aforesaid pinions are mounted eccentrically with respect to the alined shaft sections.

4. Power transmission mechanism including an internal gear mechanically coupled with the load; a second internal gear adapted to rotate idly; mechanically coupled pinions one in mesh with each internal gear; means for checking the rotation of the second internal gear; and a shaft structure surrounded by the internal gears and passing between these internal gears and the pinions, said shaft structure including two alined sections and an intervening yoke section upon which yoke section the aforesaid pinions are mounted eccentrically with respect to the alined shaft sections.

5. Power transmission mechanism including an internal gear mechanically coupled with the load; a second internal gear adapted to rotate idly and whose pitch circle is larger than the pitch circle of the first internal gear; a third internal gear adapted to rotate idly and whose pitch circle is smaller than the pitch circle of the first internal gear; mechanically coupled pinions, one in mesh with each internal gear; a stationary casing inclosing said gear elements; means, coöperating with said casing, for checking the rotation of the second internal gear; means, coöperating with said casing, for checking the rotation of the third internal gear; a shaft structure surrounded by the internal gears and passing between these internal gears and the pinions, said shaft structure including two alined sections and an intervening yoke section upon which yoke section the aforesaid pinions are mounted eccentrically with respect to the alined shaft sections; and a load driving quill shaft surrounding one of the aforesaid alined shaft sections and mechanically connected with the first internal gear.

6. Power transmission mechanism including an internal gear mechanically coupled with the load; a second internal gear adapted to rotate idly and whose pitch circle is larger than the pitch circle of the first internal gear; a third internal gear adapted to rotate idly and whose pitch circle is smaller than the pitch circle of the first internal gear; mechanically coupled pinions, one in mesh with each internal gear; means for checking the rotation of the second internal gear; means for checking the rotation of the third internal gear; a shaft structure surrounded by the internal gears and passing between these internal gears and the pinions, said shaft structure including two alined sections and an intervening yoke section upon which yoke section the aforesaid pinions are mounted eccentrically with respect to the alined shaft sections; and a load driving quill shaft surrounding one of the aforesaid alined shaft sections and mechanically connected with the first internal gear.

7. Power transmission mechanism including an internal gear mechanically coupled with the load; a second internal gear adapted to rotate idly and whose pitch circle is larger than the pitch circle of the first internal gear; a third internal gear adapted to rotate idly and whose pitch circle is smaller than the pitch circle of the first internal gear; mechanically coupled pinions, one in mesh with each internal gear; a stationary casing inclosing said gear elements; means, coöperating with said casing, for checking the rotation of the second internal gear; means, coöperating with said casing, for checking the rotation of the third internal gear; and a shaft structure surrounded by the internal gears and passing between these internal gears and the pinions, said shaft structure including two alined sections and an intervening yoke section upon which yoke section the aforesaid pinions are mounted eccentrically with respect to the alined shaft sections.

8. Power transmission mechanism including an internal gear mechanically coupled with the load; a second internal gear adapted to rotate idly and whose pitch circle is larger than the pitch circle of the first internal gear; a third internal gear adapted to rotate idly and whose pitch circle is smaller than the pitch circle of the first internal gear; mechanically coupled pinions, one in mesh with each internal gear; means for checking the rotation of the second internal gear; means for checking the rotation of the third internal gear; and a shaft structure surrounded by the internal gears and passing between these internal gears and the pinions, said shaft structure including two alined sections and an intervening yoke section upon which yoke section the aforesaid pinions are mounted eccentrically with respect to the alined shaft sections.

9. Power transmission mechanism including an internal gear mechanically coupled with the load; a second internal gear adapted to rotate idly and whose pitch circle is larger than the pitch circle of the first internal gear; a third internal gear adapted to rotate idly and whose pitch circle is larger than the pitch circle of the second internal gear; a fourth internal gear adapted to rotate idly and whose pitch circle is smaller than the pitch circle of the first internal gear; mechanically coupled pinions, one in mesh with each internal gear; a stationary casing inclosing said gear elements; means, coöperating with said casing, for checking the rotation of the second internal gear; means, coöperating with said casing, for checking the rotation of the third internal gear; means, coöperating with said casing, for checking the rotation of the fourth internal gear; a shaft structure surrounded by the internal gears and passing between these internal gears and the pinions, said shaft structure including two alined sections and an intervening yoke section upon which yoke section the aforesaid pinions are mounted eccentrically with respect to the alined shaft sections; and a load driving quill shaft surrounding one of the aforesaid alined shaft sections and mechanically connected with the first internal gear.

10. Power transmission mechanism including an internal gear mechanically coupled with the load; a second internal gear adapted to rotate idly and whose pitch circle is larger than the pitch circle of the first internal gear; a third internal gear adapted to rotate idly and whose pitch circle is larger than the pitch circle of the second internal gear; a fourth internal gear adapted to rotate idly and whose pitch circle is smaller than the pitch circle of the first internal gear; mechanically coupled pinions, one in mesh with each internal gear; means for checking the rotation of the second internal gear; means for checking the rotation of the third internal gear; means for checking the rotation of the fourth internal gear; a shaft structure surrounded by the internal gears and passing between these internal gears and the pinions, said shaft structure including two alined sections and an intervening yoke section upon which yoke section the aforesaid pinions are mounted eccentrically with respect to the alined shaft sections; and a load driving quill shaft surrounding one of the aforesaid alined shaft sections and mechanically connected with the first internal gear.

11. Power transmission mechanism including an internal gear mechanically coupled with the load; a second internal gear adapted to rotate idly and whose pitch circle is larger than the pitch circle of the first internal gear; a third internal gear adapted to rotate idly and whose pitch circle is larger than the pitch circle of the second internal gear; a fourth internal gear adapted to rotate idly and whose pitch circle is smaller than the pitch circle of the first internal gear; mechanically coupled pinions, one in mesh with each internal gear; a stationary casing inclosing said gear elements, means coöperating with said casing, for checking the rotation of the second internal gear; means, coöperating with said casing, for checking the rotation of the third internal gear; means, coöperating with said casing, for checking the rotation of the fourth internal gear; and a shaft structure surrounded by the internal gears and passing between these internal gears and the pinions, said shaft structure including two alined sections and an intervening yoke section upon which yoke section the aforesaid pinions are mounted eccentrically with respect to the alined shaft sections.

12. Power transmission mechanism including an internal gear mechanically coupled with the load; a second internal gear adapted to rotate idly and whose pitch circle is larger than the pitch circle of the first internal gear; a third internal gear adapted to rotate idly and whose pitch circle is larger than the pitch circle of the second internal gear; a fourth internal gear adapted to rotate idly and whose pitch circle is smaller than the pitch circle of the first internal gear; mechanically coupled pinions, one in mesh with each internal gear; means for checking the rotation of the second internal gear; means for checking the rotation of the third internal gear; means for checking the rotation of the fourth internal gear; and a shaft structure surrounded by the internal gears and passing between these internal gears and the pinions, said shaft structure including two alined sections and an intervening yoke section upon which yoke section the aforesaid pinions are mounted eccentrically with respect to the alined shaft sections.

13. Power transmission mechanism including an internal gear mechanically coupled with the load; a second internal gear adapted to rotate idly and whose pitch circle is larger than the pitch circle of the first internal gear; a third internal gear adapted to rotate idly and whose pitch circle is larger than the pitch circle of the second internal gear; mechanically coupled pinions, one in mesh with each internal gear; a stationary casing inclosing said gear elements; means, coöperating with said casing, for checking the rotation of the second internal gear; means, coöperating with said casing, for checking the rotation of the third internal gear; a shaft structure surrounded by the internal gears and passing between these internal gears and the pinions, said shaft structure including two alined sections and an intervening yoke section upon which yoke section the aforesaid pinions are mounted eccentrically with respect to the alined shaft sections; and a load driving quill shaft surrounding one of the aforesaid alined shaft sections and mechanically connected with the first internal gear.

14. Power transmission mechanism including an internal gear mechanically coupled with the load; a second internal gear adapted to rotate idly and whose pitch circle is larger than the pitch circle of the first internal gear; a third internal gear adapted to rotate idly and whose pitch circle is larger than the pitch circle of the second internal gear; mechanically coupled pinions, one in mesh with each internal gear; means for checking the rotation of the second internal gear; means for checking the rotation of the third internal gear; a shaft structure surrounded by the internal gears and passing between these internal gears and the pinions, said shaft structure including two alined sections and an intervening yoke section upon which yoke section the aforesaid pinions are mounted eccentrically with respect to the alined shaft sections; and a load driving quill shaft surrounding one of the aforesaid alined shaft sections and mechanically connected with the first internal gear.

15. Power transmission mechanism including an internal gear mechanically coupled with the load; a second internal gear adapted to rotate idly and whose pitch circle is larger than the pitch circle of the first internal gear; a third internal gear adapted to rotate idly and whose pitch circle is larger than the pitch circle of the second internal gear; mechanically coupled pinions, one in mesh with each internal gear; a stationary casing inclosing said gear elements, means coöperating with said casing, for checking the rotation of the second internal gear; means, coöperating with said casing, for checking the rotation of the third internal gear; and a shaft structure surrounded by the internal gears and passing between these internal gears and the pinions, said shaft structure including two alined sections and an intervening yoke section upon which yoke section the aforesaid pinions are mounted eccentrically with respect to the alined shaft sections.

16. Power transmission mechanism including an internal gear mechanically coupled with the load; a second internal gear adapted to rotate idly and whose pitch circle is larger than the pitch circle of the first internal gear; a third internal gear adapted to rotate idly and whose pitch circle is larger than the pitch circle of the second internal gear; mechanically coupled pinions, one in mesh with each internal gear; means for checking the rotation of the second internal gear; means for checking the rotation of the third internal gear; and a shaft structure surrounded by the internal gears and passing between these internal gears and the pinions, said shaft structure including two alined sections and an intervening yoke section upon which yoke section the aforesaid pinions are mounted eccentrically with respect to the alined shaft sections.

In witness whereof, I hereunto subscribe my name this twelfth day of October, A. D. 1917.

EMIL G. JOHANSON.